US012423274B1

(12) United States Patent
Kumar et al.

(10) Patent No.: US 12,423,274 B1
(45) Date of Patent: Sep. 23, 2025

(54) MODIFICATION OF DATABASE OBJECTS

(71) Applicant: ServiceNow, Inc., Santa Clara, CA (US)

(72) Inventors: Abhishek Kumar, Bangalore (IN); Ramesh Kumar, Bangalore (IN); Praveen Singh Thakur, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/596,517

(22) Filed: Mar. 5, 2024

(51) Int. Cl.
*G06F 16/21* (2019.01)

(52) U.S. Cl.
CPC .................................. *G06F 16/21* (2019.01)

(58) Field of Classification Search
CPC ....................................................... G06F 16/21
USPC ................................................. 707/806, 807
See application file for complete search history.

(56) References Cited

U.S. PATENT DOCUMENTS

| 11,339,007 B2* | 5/2022 | Börret | B65G 47/64 |
| 2015/0113001 A1* | 4/2015 | Prieto | H04L 41/0853 |
| | | | 707/748 |
| 2023/0107818 A1* | 4/2023 | Silva | H04L 12/2825 |
| | | | 700/275 |
| 2023/0401139 A1 | 12/2023 | Casati et al. | |

FOREIGN PATENT DOCUMENTS

EP 3467657 B1 4/2021

OTHER PUBLICATIONS

International Search Report and Written Opinion for PCT Application No. PCT/US2025/017506 dated Jun. 11, 2025; 8 pgs.

* cited by examiner

*Primary Examiner* — Baoquoc N To
(74) *Attorney, Agent, or Firm* — FLETCHER YODER PC (57) ABSTRACT

Various implementations disclosed herein include obtaining data indicative of a request to modify a configuration item (CI) of a database and one or more portions of a pattern applicable to a service based, at least in part, on the request. A command is identified based on the one or more portions and one or more values of the CI are modified using the command.

20 Claims, 6 Drawing Sheets

MODIFICATION OF DATABASE OBJECTS

TECHNICAL FIELD

The present disclosure relates to using one or more machine learning models to identify commands for updating configuration items of a database.

BACKGROUND

In modern computing systems and environments, and as businesses increasingly rely on technology for their day-to-day operations, databases storing data may include large quantities of configurable items. As the configurable items may change or become outdated, modifications of the configuration items can lead to inaccuracies.

BRIEF DESCRIPTION OF THE DRAWINGS

Various embodiments in accordance with the present disclosure will be described with reference to the drawings, in which.

DETAILED DESCRIPTION

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

A computing system may include a network of a large number of members, such as devices, infrastructure elements, and services, among others. The members may have configurable parameters that can be stored as configuration items (CIs) and a performance of the computing system may be dependent upon how up-to-date and well matched the CIs are to their respective members. Each CI may be a value or attribute that can be modified by a user of the computing system to manage the operation of the computing system members.

Modification, e.g., updating or otherwise selective altering, of the CI may demand running discovery on a host (e.g., a computing device that is connected to the computing system members by a network, such as a wireless network or a hard-wired network), which requires parsing some or all the logs on the host to determine how many applications are being run and to locate a CI of an application that is to be altered. Running discovery allows all applications (e.g., applications stored at a database) to be identified and records details of the applications, including variable values. A user may be required to manually review CI details to assess and analyze the variable values, which may be time-consuming. Moreover, a process of running discovery may lack a user-friendly interface for accessing the database. For example, for a computing system with multiple servers, a software version for operating the servers may change at certain servers. In order to update the software version for those servers, full discovery is demanded even though at a backend of the computing system, updating the software version entails simply submitting a command to retrieve a desired version which can be used to update the corresponding CI. Discovery may be slow, particularly when the computing system is large and includes many applications and CIs. Furthermore, running discovery may cause operations of the computing system to be suspended until discovery is complete.

Alternatively, a user may manually locate a CI that is to be modified. This, however, may require the user to know a correct pattern to find the CI, the pattern being a set of rules or criteria used to identify specific members or resources within a computing system. For example, a pattern may be configured to recognize different CIs based on attributes, versions, locations in the computing system, dependencies on other CIs, resources used, and the like. Location of a target CI may be challenging if a suitable pattern is not already known. Further, the user may not be aware of dependencies between the target CI and other CIs and may not propagate changes to the target CI to dependent CIs. Manual entry of modifications to a CI may therefore lead to errors that may cause data inconsistencies and delays. Furthermore, attempts to alter CIs without running full-scale discovery may face issues such as resource and time constraints, data integrity concerns, auditing and compliance issues, and user accessibility, where a user-friendly interface for facilitating the alteration is lacking. As such, modifying CIs (e.g., updating stale data and performing fast synchronizations at an attribute level) or creating new, shallow CIs (CIs that do not have dependencies on existing CIs) in a computing system may be a time-consuming, complicated task that relies on one or more of full discovery cycles, manual data entry, and uncontrolled data manipulation, which may result in operational efficiencies, increased costs, and data inconsistencies. In some instances, users may be deterred from updating the CIs which may cause the computing system to operate on stale, outdated data.

The present disclosure relates to a method comprising obtaining data indicative of a request to modify a CI of a database and obtaining, based at least in part on the request, one or more portions of a pattern applicable to a service. The method may further comprise identifying a command associated with the service, based on the one or more portions of the pattern, and modifying one or more values of the CI using the command.

In at least one embodiment, the service may be a database management service configured with tools to allow a user to readily modify CIs without running discovery. For example, by using a machine learning model (e.g., a neural network) trained to parse input information and to match the input information to a predetermined set of allowed commands, a command to locate a target CI for modification may be provided by the database management service. The input information may be provided by a user, for example. In at least some embodiments, the database management service may also be configured to automatically perform the requested modifications when the target CI is found. Moreover, in instances where the target CI cannot be located because, for example, the CI does not exist in a computing system managed by the database management service, a new, shallow CI (e.g., a CI without any dependencies on other CIs) may be created based on the input information.

The service may be provided over a variety of platforms, including any wireless and hard-wired networks, and may be accessible through via different platforms and interfaces, including, but not limited to cloud computing systems and command line interfaces (CLIs). In at least one embodiment, the service may be used to modify CIs stored in a database, such as a Configuration Management Database (CMDB). The CMDB may house data pertaining to Information Technology (IT) assets, relationships, and dependencies, all of which play pivotal roles in the effective management of IT operations. The service may provide users, or entities used to access and manage the CMDB, with an efficient process for CI alteration and shallow CI creation using predefined authorized commands. The process may be initiated either on-demand (e.g., quick synchronization) or scheduled as required. To create the shallow CI, complete patterns are not relied upon, which allows resources to be identified faster.

In at least one embodiment, the service provides a CLI at which users may input information to the service in a secure manner and uses one or more neural networks to interpret steps required to update specific attributes from a Pattern Network Description Language (NDL). The service further includes tracking of executed commands for auditing and provides mechanisms for maintaining data integrity. For example, via the service, CIs may be quickly synchronized and updated with running full discovery cycles, manual data entry may be reduced and CI management may be streamlined. Modifications to the CIs may be conducted using predefined commands and logic, thereby ensuring that changes are controlled and secure. As a user, or other entity providing input to the service, may use only authorized commands, a likelihood of unauthorized modifications being performed may be decreased. Data integrity may be maintained during modification of the CIs by providing robust error handling and rollback mechanisms. Furthermore, the CLI may provide an intuitive and familiar way for users to interact with the service, which may enhance accessibility. Details of the service are provided below, with reference to FIGS. 1-5.

Figure 1:
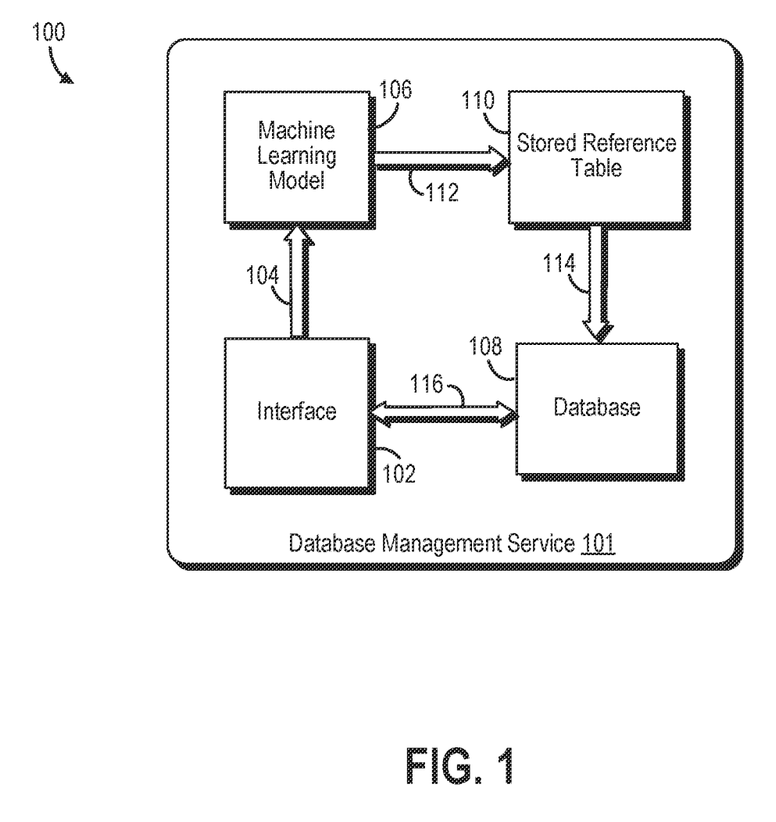
FIG. 1 illustrates an example of a database management service, through which configuration items (CIs) of a computing system may be modified, according to at least one embodiment.
Figure 6:
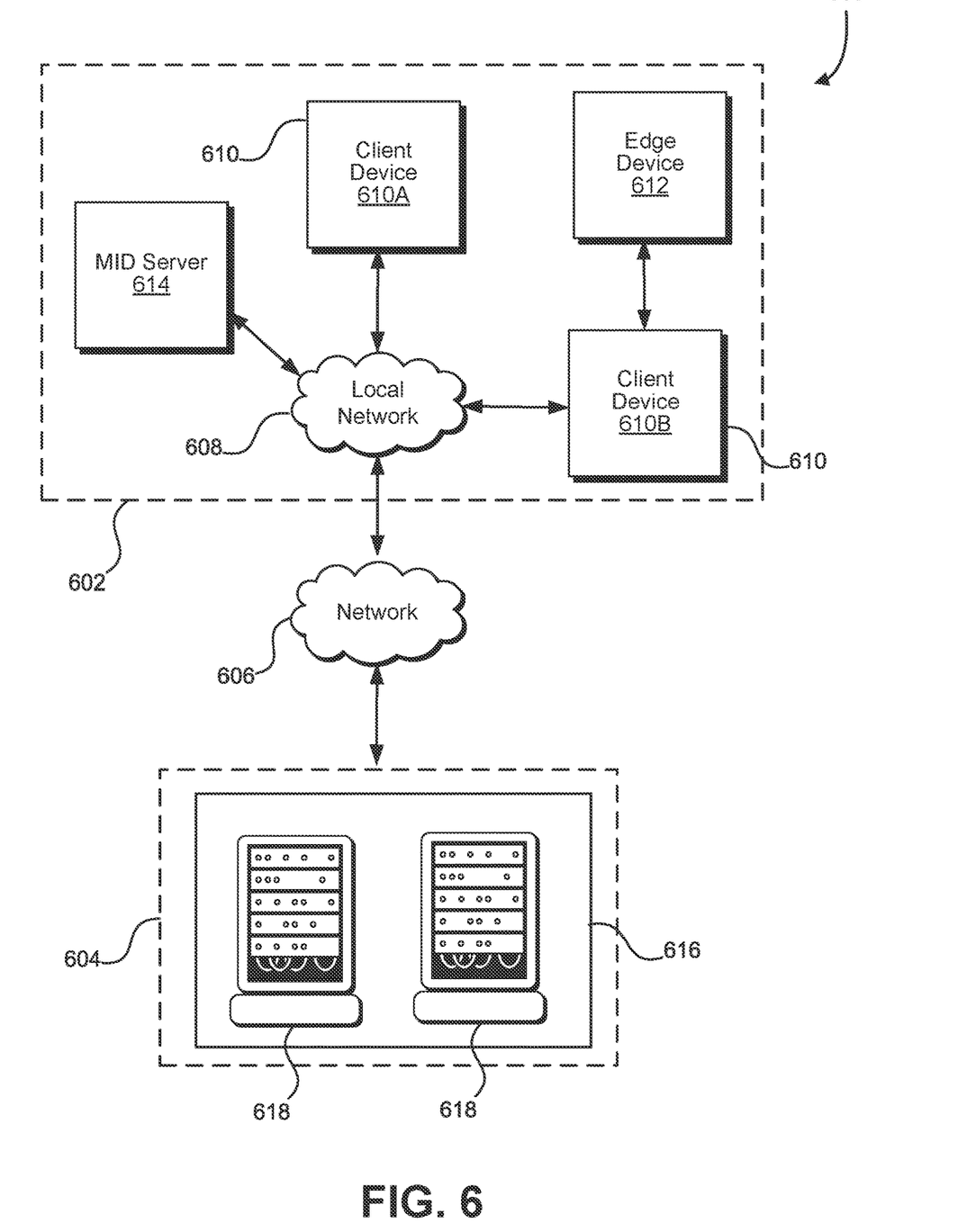
FIG. 6 illustrates a system in which various embodiments can be implemented.

FIG. 1 illustrates an example of a content management system 100 which may be implemented at one or more processing units, e.g., processors, of a computing system, such as a computing system 600 of FIG. 6. In at least one embodiment, the content management system 100 may include a database management service 101 configured to retrieve commands specific to locating one or more selected CIs of a computing system and implement modifications to the one or more selected CIs. The database management service 101 may be hosted at a member of the computing system, such a computing device (e.g., client devices 610 of FIG. 6), in one embodiment. Alternatively, in at least one embodiment, the database management service 10101 may be provided via a cloud. In other embodiments, the database management service 101 may be implemented through a variety of wireless or hard-wired networks and/or platforms. Data used and monitored by the database management service 101 may be stored at a memory of the host member or at a memory shared among the computing system members.

The database management service 101 may include an interface 102 at which inputs for requesting a search for a CI, along with desired modifications to the CI, may be received by the database management service 101. In at least one embodiment, when the database management service 101 is hosted at a computing device, the interface 102 may be a CLI at which a request to locate and/or modify a CI may be indicated to the database management service 101. Alternatively, when the database management service 101 is hosted at a cloud platform, the interface 102 may be a software-implemented mechanism for receiving inputs. The request may be input by a user, by software algorithms, by a machine learning algorithm, or some other entity able to indicate that a CI is to be changed, updated, or created. In at least one embodiment, the interface 102 may be implemented at a user interface of one or more of the computing system members, such as at a user display of the host member. For example, the user may enter lines of text, e.g., command lines, at the user interface to the interface 102 which may prompt the database management service 101 to perform tasks based on the entered text. As another example, information may be input to the interface 102 from a virtual entity, such as a software program, a machine learning model, etc. In at least one embodiment, the text may be input according to a specific syntax according to an operating system used at the receiving computing system member.

As an example, a user may enter a command to either establish a shallow CI or to update specific attributes of a CI. The user, as referred to hereon, may be any one of a human user, user device, computing device, and/or a virtual entity. The command may include input parameters, such as one or more of a pattern name, a CI name, an IP address, and a list of CI attributes to be modified or created. The input parameters may be used to identify allowed commands that correspond to the request that is input by the user.

Information entered at the interface 102 may be shared, as indicated by arrow 104, with a machine learning model 106 of the database management service 101. In at least one embodiment, the machine learning model 106 may include one or more neural networks. In yet other embodiments, the machine learning model 106 may include a large language model (LLM), which may be a deep learning algorithm for performing natural language processing (NLP) tasks, such as recognizing, translating, predicting, and/or generating text. The machine learning model 106 may further include any suitable types of neural networks for performing the tasks described herein. Details of the machine learning model 106 are provided further below, with reference to FIG. 3.

Information that is entered at the interface 102, after verification that the information is entered in the correct syntax and can be recognized by the machine learning model 106, may trigger a call to the machine learning model 106. Upon receiving the call, the machine learning model 106 may identify steps, e.g., portions, of a pattern from the parameters input by the user according to a NDL of a database 108 of the database management service 101. For example, the machine learning model 106 may be trained to obtain one or more names of steps included in a pattern identified from the input parameters. The pattern may be identified as a pattern that the NDL would invoke while running discovery on a host.

The machine learning model 106 may output one or more step names which may be used by logic of the database management service 101 to compare the one or more steps names to entries of a reference table 110, as indicated by arrow 112. The reference table may be stored in memory, such as a memory of the host computing device, or at a shared memory accessible to the members of the computing system. The reference table 110 may be, in at least one embodiment, an allowed list of commands that are recognized and used by the database management service logic to initiate performance of tasks, such as modifying one or more CIs of the computing system. For example, step names may be mapped to one or more specific commands in the reference table and one or more commands corresponding to the step names identified from the request entered at the interface 102 may be retrieved.

The retrieved commands may be applied to the database 108, as indicated by arrow 114, by the database management service logic. The database 108 may be, as one example, a server logging all available members, applications, and CIs of the computing system. In at least one embodiment, the database management service 101 may generate a task or job to be performed by a processing unit of the database management service 101 based on the retrieved commands. Information provided by the user at the interface 102 may also be applied to the database 108, as indicated by arrow 116, to locate a CI corresponding to the user request. For example, the CI attributes and IP address entered by the user at the interface 102 may be used to determine whether a CI having the entered CI attributes and IP address is present in the database.

In some instances, the CI may be located in the database 108 and the attributes of the CIs may be modified according to the user's request. The CI names, identifying information, old and new attribute values may be relayed back to the interface 102 to be displayed to the user. In other instances, the CI may not be located in the database 108, e.g., the CI does not exist in the database 108. A new CI may be created based on the user request when the requested CI is not found. The new CI may be a shallow CI that includes only attributes that are identifiers. In at least one embodiment, the CI name and identification information may be displayed at the interface 102 as a notification, e.g., to the user.

Figure 2:
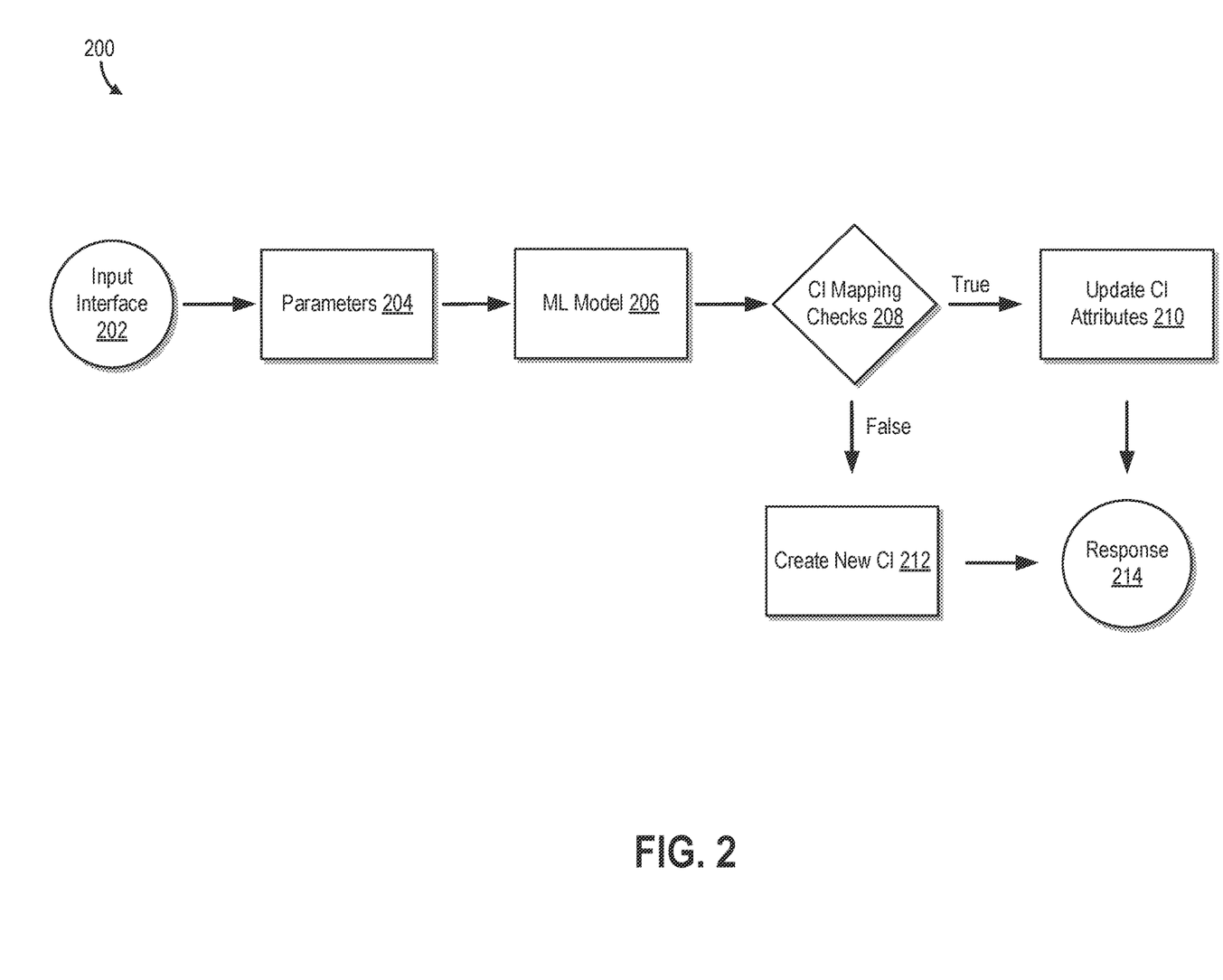
FIG. 2 illustrates an example of a database management service, according to at least one embodiment.

FIG. 2 shows a block diagram depicting an overview of a database management service 200. The database management service 200 may be used to manage a database, such as a CMDB. In at least one embodiment, the database management service 200 may be an example of the database management service 101 of FIG. 1. A job may be submitted at an interface 202, which may be implemented at a terminal of a computing system, such as a CLI terminal. The job may be a request to modify or create a CLI. In at least one embodiment, the interface 202 may be a CLI, such as a Command Prompt for Windows, a Bourne Again Shell for Linus, or a Terminal for MacOs, although other types of CLIs are possible. The job may be submitted by a user, a user device, a computing device, a virtual machine or entity, etc. The submitted job may include parameters 204, including, but not limited to, one or more pattern names, one or more CI names, one or more IP addresses, and a list of corresponding attributes to be updated in an existing CI of to create a shallow CI.

At a backend of the database management service 200 (e.g., data and operating code for the service), validation of the input parameters may be performed (e.g., verifying accuracy and quality of information), and upon validation of the input parameters, a call to a machine learning model 206 may be triggered. In at least one embodiment, the machine learning model 206 may be a LLM trained to identify steps within the input one or more patterns to populate a specific attribute of one or more CIs. Training of the machine learning model 206 is described further below, with reference to FIG. 5. In other embodiments, however, the machine learning model 206 may be one or more other types of natural language processing models, such as fine-tuned models, edge models, etc. Upon receiving the validated parameters, the machine learning model may infer one or more step names corresponding to the parameters.

The database management service 200 may include logic to perform CI mapping checks 208, which may include querying an "Allowed List table" to retrieve one or more commands associated with the one or more step names output by the machine learning model 206. Using the retrieved one or more commands, a new job may be generated to execute the one or more commands. For example, a new External Communication Channel (ECC) Queue job may be created based on the one or more commands. Following execution of the new job, the database management service 200 may perform the CI mapping checks 208 to confirm if a CI corresponding to the input parameters (e.g., the one or more IP addresses and CI names).

If a match is found, (e.g., "True"), the specified attribute's value may be updated 210 in the database and the CI names, sysId, along with the old and new attribute values may be relayed back to the terminal to provide a response 214. In at least one embodiment, the response 214 may be displayed, or otherwise indicated at the terminal. Alternatively, when no matching CI is found (e.g., "False"), a shallow CI may be created. The shallow CI may include only the attributes provided as identifiers in the input parameters. A name and sysId of the new CI may be returned to the terminal as the response 214, which may be displayed, or otherwise indicated at the terminal.

Figure 3:
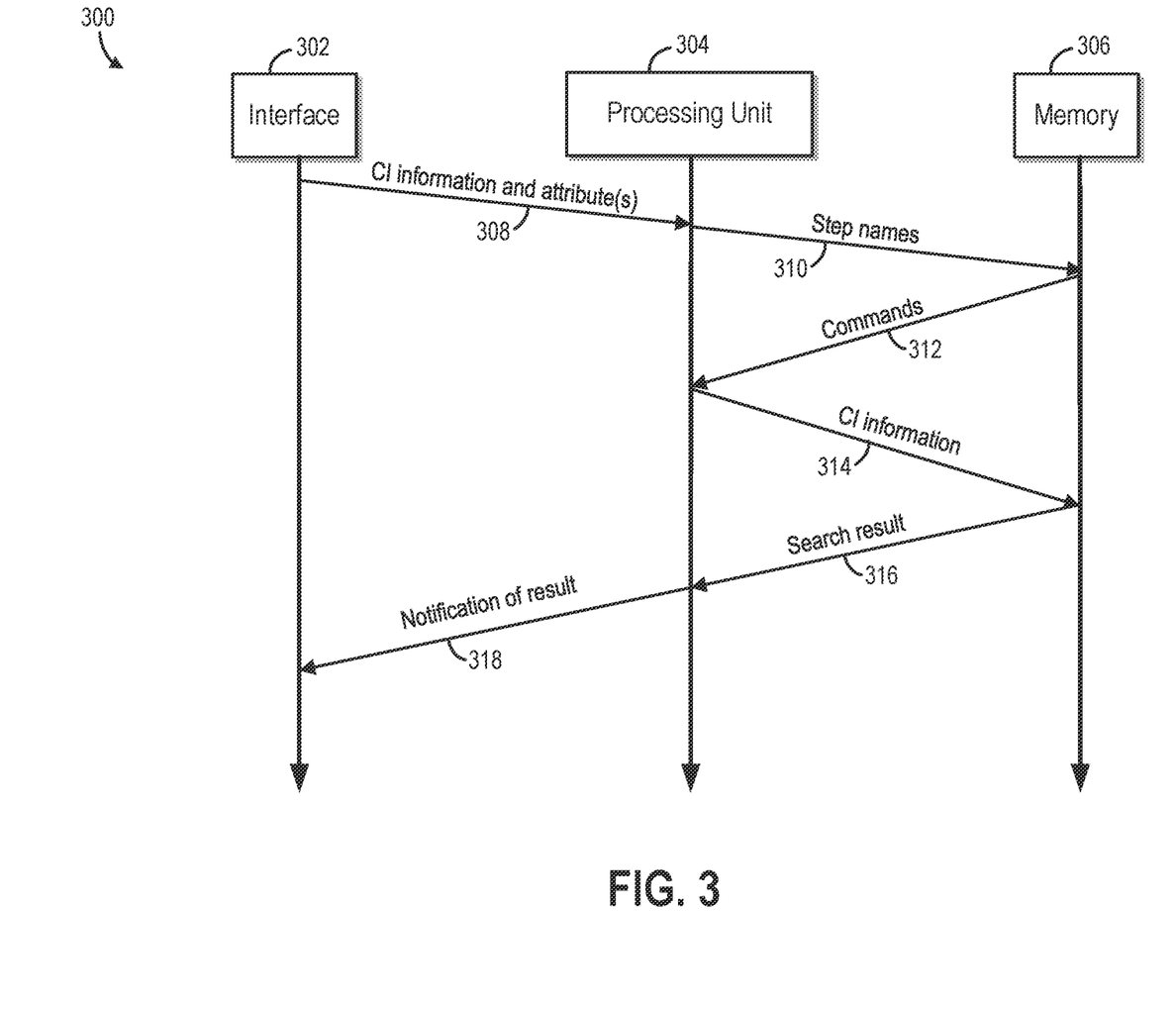
FIG. 3 illustrates an example of data flow between components of a database management service, according to at least one embodiment.

An exemplary data flow 300 representing transmission of data among components of a database management service is shown in FIG. 3. Communication of data between the components of the database management service may be facilitated by the database management service computing logic. In at least one embodiment, the database management service may be implemented similarly to the database management service 101 of FIGS. 1 and 200 of FIG. 2. For example, as shown in FIG. 3, the database management service may be accessed via an interface 302, a processing unit 304, and a memory 306. In at least one embodiment, the interface 302 may be implemented at a terminal, such as a computing device with a graphical interface. In other embodiments, the interface 302 may not include a visible display but may instead be a mechanism for exchanging information between the database management service and another entity. The processing unit 304 may include circuitry to host and perform the machine learning model and also execute operations of the database management service using the database management service logic. In at least one embodiment, the processing unit 304 and the memory 306 may be included in a provider platform, such as a provider platform 604 of FIG. 6, described further below. The memory 306 may store a table of allowed commands as well as a database that logs computing system members, applications running on the members, and CIs of the members. The allowed commands may be used to locate and modify CIs of the database.

Sending and/or sharing of data is indicated by arrows in the data flow 300. For example, information entered with a request, including one or more of a CI name, location, a pattern name, an IP address, attributes of the CI to be modified or created, and values for the attributes, may be sent to the processing unit 304 hosting the machine learning model from the interface 302, as indicated by arrow 208. In one example, a user may initiate modification or creation of a CI by entering a command such as "createOrUpdateCI," and entering the information described above.

The initiation command and information may be received at the processing unit 304 and the information may be input to the machine learning model. As described above, the machine learning model may output one or more step names based on the information. As indicated by arrow 310, the step names may be used to identify matches between the step names output by the machine learning model and step names logged in the table of the allowed commands stored at the memory 306. A set of allowed commands may be retrieved from the table based on matches between the step names and the logged step names in the table, where the logged step names are mapped to respective allowed commands. The set of allowed commands may represent implementable commands that may be implemented by the database management service to locate and/or modify the CI. The retrieved set of allowed commands may be sent to the processing unit 304, as indicated by arrow 312, to generate a task for modifying the CI as requested, using the implementable commands.

The processing unit 304 may use the information input at the interface 302, such as the CI name and IP address, to determine if the CI to be modified or created exists in the database. For example, as indicated by arrow 314, the processing unit 304 may use the CI information to perform a search at the database stored in the memory 306. The search may result in either return of the CI location in the database or confirmation that the CI is not in the database. Results of the search may be sent to the processing unit 304, as indicated by arrow 316, where the processing unit may perform tasks based on the results of the search. For example, if the CI was located in the database during the search, the processing unit 304 may proceed to update the CI based on the attribute values input at the interface 302. If, however the CI was not located in the database during the search, the processing unit may proceed to create a new, shallow CI based on the attributes and attribute values input at the interface 302.

A notification of the results may be sent to the interface 302 from the processing unit 304, as indicated by arrow 318. In at least one embodiment, when the interface 302 is implemented at the terminal, the notification may be displayed at the terminal. If the CI is located in the database, the notification may include, for example, where the CI is located in the database, as well as new and former attribute values of the CI. Alternatively, if the CI is not found in the database and a new CI is created, the notification may include displaying confirmation that the new CI has been created as well as information regarding the new CI, such as a name, attribute, and attribute values of the CI that are based on the input at the interface 302.

Figure 4:
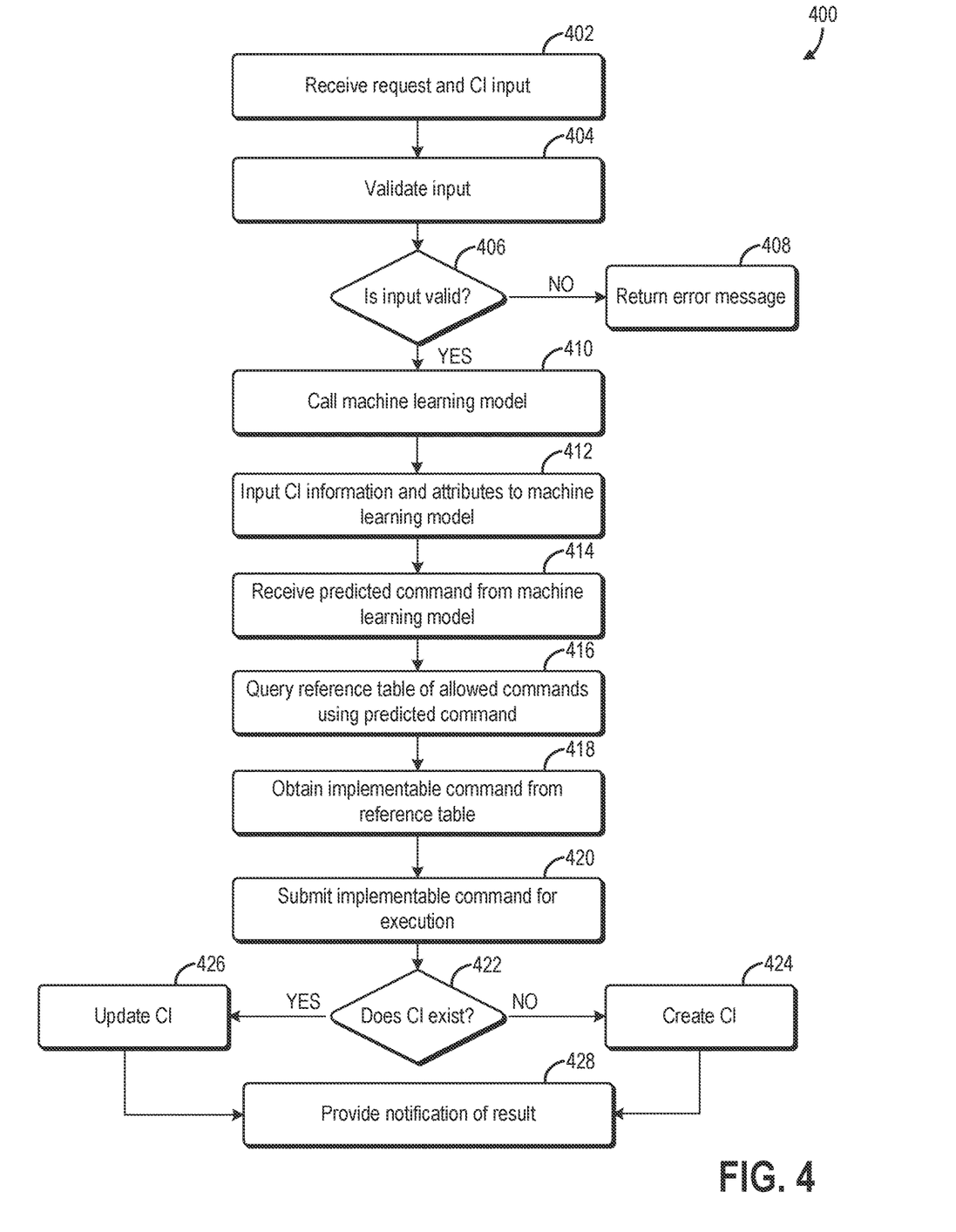
FIG. 4 illustrates an example of a process for modifying CIs of a computing system using the database management service of FIG. 1, according to at least one embodiment.

FIG. 4 illustrates an example process 400 in which one or more database management services are used to modify CIs of a computing system, in accordance with at least one embodiment. In at least one embodiment, a computing system comprising one or more computing devices, such as the computing system 600 of FIG. 6, performs one or more steps 402-428 in process 400 using the one or more computing devices. In at least one embodiment, at least one of the one or more computing devices may include one or more processors configured with executable instructions to perform the steps of process 400.

In at least one embodiment, the database management service may include the components illustrated in FIG. 1. That is, the database management service may include one or more machine learning models, as well as algorithms for performing back-end scripts and fulfilling user requests, as described further below. As such, the database management service may include algorithms for both sending and receiving data, calling and inputting data to the machine learning model, using the machine learning model to generate a prediction, using the prediction to complete one or more tasks according to user input, and return information to a user. The database management service may further access a database, such as the database 108 of FIG. 1, storing information corresponding to all CIs of the computing system. In at least one embodiment, the database may be included at a server of the computing system (e.g., elements 618 of FIG. 6).

In at least one embodiment, step 402 of process 400 may include receiving a request input to an interface of the database management service, such as the interfaces 102 and 302 of FIGS. 1 and 3, respectively. In at least one embodiment, the interface may be a CLI of a CLI terminal that may be configured to receive input from user. In other examples, however, the interface may be a virtual tool that allows input to receive by the database management service by a virtual entity. In at least one embodiment, the input may include a request to modify a CI and further include information regarding the CI to be modified, such as a name, IP address, and attributes of the CI, as well as desired attribute values. As an example, the input may include a string of text at the CLI, such as:

CommandToCreateORUpdateCI- -pattern="WindowOS-Server"- -ci="cmdb_ci_win_server"- -attributes="serial_number"- -targetIP="10.196.39.90

The string of text, as shown above, may indicate a pattern to search, a name of the CI, a serial_number of the CI, and an IP address of the CI. Validation of the string of code may be performed at step 404. For example, back-end script of the CLI may include instructions to confirm that the input pattern input exists and adheres to a format that is recognized and used by the database management service. In at least one embodiment, the back-end script may include instructions to call one or more APIs to facilitate validation of the input.

At step 406, process 400 may include confirming if the input is valid. If the input is not valid, process 400 may proceed to step 308 which may include returning an error message. The error message may be transmitted to the entity that input the request to the database management service, in one example, or may be displayed at the CLI terminal, as another example. The error message may, for example, indicate that the input is invalid and that adjustments to a syntax or format of the input are needed. If the input is validated, process 400 may continue to step 410 which may include calling the machine learning model. In at least one embodiment, the machine learning model may be a LLM, although other types of machine learning models may be used. The machine learning model may be called via, for example, an API, where the API may be called in response to confirmation that the input is valid. In at least one embodiment, the learning model may be called using a command, such as:

fetchCommand("Windows OS-Server","cmdb_serial-number", "10.196.39.90,["serial_number" ])

At step 412, process 400 may include inputting information obtained from the input regarding the CI and desired modifications to the CI to the machine learning model. In at least one embodiment, the machine learning model may be trained to discern one or more patterns from the input that may be required to populate an attribute of the CI. For example, the machine learning model may generate one or more predicted step names based on the pattern included in the input, where the step name may be a name of an action corresponding to a command used by the database management service for locating and modifying CIs. The machine learning model may therefore be trained to convert input information into one or more key terms or key phrases that can be matched to language used to send instructions to a tool configured to search the database (e.g., a database tool). The machine learning model may identify the key term or phrase from the pattern and generate the step name according to the key term or phrase. In at least one embodiment, the step name generated by the machine learning model may be a predicted command.

At step 414, process 400 may include receiving the predicted command from the machine learning model. The predicted command may be used, at step 416, to query a reference table stored at a memory of the computing device. In other examples, however, the reference table may be stored elsewhere, such as at a remote memory location or at another computing device. In at least one embodiment, the reference table may be a table of allowed commands where the allowed commands have a syntax or format specific to the database. The table of allowed commands may list commands corresponding to tasks that can be performed by the database management service.

In at least one embodiment, querying the reference table may including generating a request using the predicted command to locate a corresponding command from the reference table. The predicted command may be used, for example, as a search criteria for in the reference table which may be mapped to one or more entries in the reference table. As an example, a request may be created, such as:
 Request→getCommandFromStep("UUID and IdentifyingNumber from Win32_ComputerSystemProduct")
where the request is to obtain commands associated with step names "UUID" and "IdentifyingNumber" for a Windows 32 computing device. The reference table may include entries such as:
 1. "Select UUID, Identifying Number FROM Win32_ComputerServiceProduct
 2. "RootMicrosoftExchangeV2" "Select*from Exchange_DSAccessDC where LDAPPort<400"
 3. "rootCIMV2" "SELECT*FROM Win32_Service"
 4. "rootMicrosoftIISv2" "SELECT State,Status FROM IIsWebService
 5. . . .
 6. . . .
 7. . . .
The first entry may be selected from the reference table as a match to the step names of the request.

For example, a response may be returned based on the selected match to the step names, such as:
 Response→command=["SELECT UUID,IdentifyingNumber FROM Win32_ComputerSystemProduct"]
At step 418, process 400 may include obtaining one or more commands from the reference table. In at least one embodiment, the commands may be entries of the reference table that match the predicted command output by the machine learning model. In at least one embodiment, the one or more commands obtained from the reference table may be implementable commands. For example, an implementable command obtained from the reference table, based on the returned response to the request to locate one or more commands shown above, may be:
 SELECT UUID, IdentifyingNumber FROM Win32_ComputerSystemProduct The implementable command above may be an instruction to generate a data packet (e.g., a payload) to be submitted for execution by a tool that parses the database to locate the CI based on the input CI information. The command may further include an instruction to generate a Universally Unique Identifier (UUID) and an identifying number for the payload. An as example, upon submission of the implementable command, the CI name and IP address entered at the interface may be used by the tool to locate the CI in the database. For example, a UUID and identifying number for a payload created for submission may be:
 UUID: 61410142-E7E7-3599-EE9B-7AC4CFB1D998
 IdentifyingNumber: VMware-42 00 41 61 e7 e7 99 35-ee 9b 7a c4 cf b1 d9 98

At step 422, process 400 may include verifying if the CI is located in the database. If the CI is not found in the database, the CI does not exist and process 400 may continue to step 424 which may include creating a new, shallow CI based on the user input. For example, an instruction may be generated by the tool to create a new CI entry in the database in response to absence of the CI from the database, such as:
 createMainCI("cmdb_ci_win_server",{Attributes})
The tool may further generate an instruction to update the new CI entry with one or more attributes input by the user, such as:
 updateCI("cmdb_serial_number",{serial_number: "a5292642-3388-d181-949-877e5f5680fb" })
where the serial_number may be one that was input at the interface as a CI attribute.

Process 400 may proceed to step 428 after creating the new CI, which may include providing a notification that the new CI has been created. The notification may include, for example, confirmation that new CI is in the database, as well as attributes and attribute values of the new CI corresponding to the attributes and attributes values input by the user. For instance, in the example, shown above, an attribute of the new CI may be a serial number input to the interface of the database management service.

If, at step 422, the CI is located in the database, process 400 may continue to step 426, which may include updating the located CI. For example, the instruction shown above for updating a CI may be used to modify indicated attribute values of the CI. For instance, a serial number of the CI may be modified according to a serial number input by the user. Process 400 may proceed to step 428, after updating the CI, which may include displaying a notification at the CLI that the CI has been updated. The notification may include displaying former attribute values of the CI along with new values that the attributes have been modified to.

In at least one embodiment, a processor performs one or more of steps 402-428 in process 400 using one or more systems described in FIG. 6 (e.g., see elements 604, 610, 612, 614, 616 and 618 in FIG. 6). In at least one embodiment, one or more steps in process 400 are otherwise combined, performed in series, and/or performed in parallel. In at least one embodiment, some or all of process 400 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 400 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 400 is performed at least in part on a computer system such as those described elsewhere in this disclosure. In at least one embodiment, logic (e.g., hardware, software, or a combination of hardware and software) performs process 400.

Modification and generation of CIs may thereby be carried out efficiently by using predefined commands and logic of a database management service described herein, which nay ensure that alterations to a database of a computing system storing the CIs are controlled and secure. This allows execution of unauthorized modifications to be mitigated and promotes maintenance of data integrity when changes are made to CIs. In at least one embodiment, by utilizing a CLI to receive requests from a user, an intuitive and familiar interface may be presented to a user to interact with the database management service. Accessibility and user-friendliness may be enhanced, which allows quick synchronization of updates and accessible and efficient creation of shallow CIs.

Figure 5:
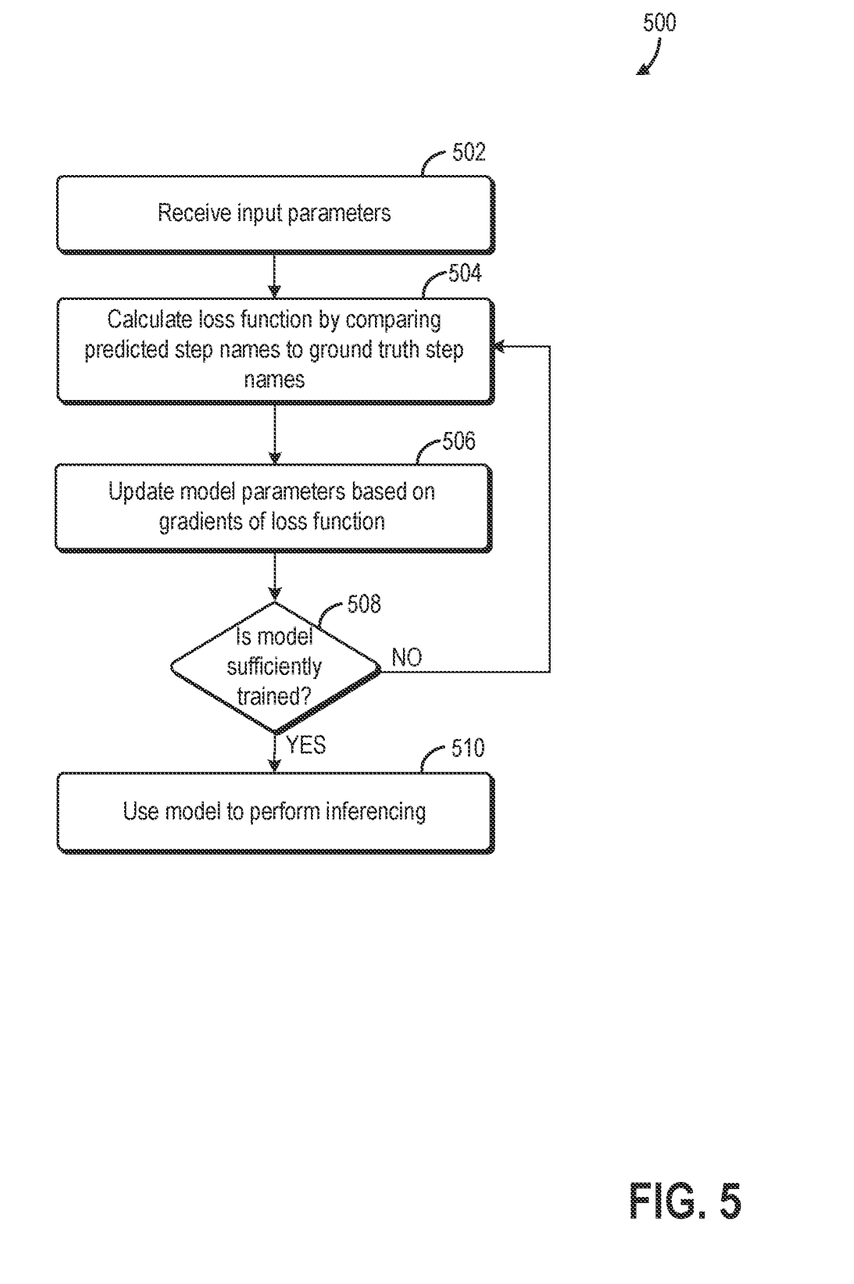
FIG. 5 illustrates an example of a process for training one or more machine learning models to generate predicted commands using, according to at least one embodiment.

FIG. 5 illustrates an example of a process 500 to train one or more machine learning models (e.g., neural networks) to generate a step name or predicted command from an input parameter, such as a pattern, and perform inferencing using said one or more machine learning models, according to at least one embodiment. In at least one embodiment, by performing process 500, a processor including one or more circuits or a system including one or more processors performs operations described herein, such as using, or otherwise causing, one or more machine learning models to identify associations between patterns provided in the input parameters and step names corresponding to allowed commands of a database management service and a database managed by the database management service. The processor may be the same processor used to implement the database management service, or may be a different processor. In at least one embodiment the database management service may the database management service 101 of FIG. 1 or 200 of FIG. 2. In at least one embodiment, by performing process 500, a processor including one or more circuits or a system including one or more processors performs operations described herein, such as using, or otherwise causing, said one or more machine learning model to generate one or more step names or predicted commands. In at least one embodiment, systems and components described in relation to FIGS. 1 and 6 can perform part or all of process 500 or be integrated into process 500. In at least one embodiment, systems and processors variously described in relation to FIGS. 1 and 6 perform part or all of process 500.

In at least one embodiment, some or all of process 500 (or any other processes described herein, or variations and/or combinations thereof) is performed under control of one or more computer systems including computer executable instructions and is implemented as code (e.g., computer executable instructions, one or more computer programs, or one or more applications) executing collectively on one or more processors, by hardware, software, or combinations thereof. In at least one embodiment, code is stored on a computer readable storage medium in a form of a computer program including a plurality of computer readable instructions executable by one or more processors. In at least one embodiment, a computer readable storage medium is a non-transitory computer readable medium. In at least one embodiment, at least some computer readable instructions usable to perform process 500 are not stored solely using transitory signals (e.g., a propagating transient electric or electromagnetic transmission). In at least one embodiment, a non-transitory computer readable medium does not necessarily include non-transitory data storage circuitry (e.g., buffers, caches, and queues) within transceivers of transitory signals. In at least one embodiment, process 500 is performed at least in part on a computer system such as those described elsewhere in this disclosure. In at least one embodiment, logic (e.g., hardware, software, or a combination of hardware and software) performs process 500.

In at least one embodiment, at step 502, the system performing at least a part of process 500 includes executable code to at least receive parameters input to the system. In at least one embodiment, the parameters may include one or more of a one or more pattern names, one or more CI names, one or more IP addresses, and a list of corresponding attributes. In at least one embodiment, the parameters may be received at an interface of the database management service, from a user, a software application, a computing device, a remote platform (e.g., a cloud), etc.

In at least one embodiment, at step 504, the system performing at least a part of process 500 includes executable code to at least calculate a loss function at least by comparing a step name predicted by the one or more machine learning models to ground truth data. In at least one embodiment the ground truth data may include actual, or verified (e.g., by a user, a software application, etc.) step names corresponding to the input parameters. In at least one embodiment, calculating the loss function may include utilizing cross-entropy loss and gradient descent to minimize the loss function. Other type of loss functions and optimization techniques may be used, however.

In at least one embodiment, at step 506, the loss function may be used to update one or more parameters of the one or more machine learning models. In at least one embodiment, updating the parameters of the machine learning models may include optimizing neural network weights. In at least one embodiment, the system performing at least a part of process 500 includes executable code to at least update the one or more parameters based, at least in part, on gradients of the loss function.

In at least one embodiment, at step 508, the system performing at least a part of process 500 includes executable code to at least infer whether the one or more machine learning models are sufficiently trained. In at least one embodiment, the one or more machine learning models are considered to be sufficiently trained if performance of the one or more machine learning models meet one or more accuracy values (e.g., one or more accuracy thresholds) or one or more convergence values (e.g., one or more convergence thresholds). In at least one embodiment, if the one or more machine learning models are not inferred to be sufficiently trained (e.g., the one or more accuracy values are not met), process 500 returns to step 504 to (re)calculate the loss function based, at least in part, on the one or more (updated) parameters of the machine learning models.

In at least one embodiment, if the one or more machine learning models are sufficiently trained (e.g., the one or more accuracy values are met), process 500 proceeds to step 510 to use the one or more machine learning models to perform inferencing. In at least one embodiment, the system performing at least a part of process 500 includes executable code to at least perform inferencing. In at least one embodiment, performing the inferencing includes generating step names or predicted commands using parameters input to the database management service.

FIG. 6 illustrates a computing system 600 in which various embodiments can be implemented. The computing system 600 may include a client network 602 and a provider platform 604 that are operably connected via a network 606 (e.g., the Internet). In an embodiment, the client network 602 may be a private local network 608, such as a local area network (LAN) connecting a variety of network devices that include, but are not limited to, switches, servers, and routers. In an embodiment, the client network 602 can comprise an enterprise network that can include one or more LANs, virtual networks, data centers, and/or other remote networks. In an embodiment, the client network 602 can be operably connected to one or more client devices 610 such as example client device 610A, 610B so that the client devices 610 are able to communicate with each other and/or with the provider platform 604. In an embodiment, the client devices 610 can be computing systems and/or other types of computing devices generally referred to as Internet of Things (IoT) devices that can access cloud computing services, for example, via a web browser application or via an edge device 612 that may act as a gateway between one or more client devices 610 and the platform 604 (e.g., second client device 610B). In an embodiment, the client network 602 can include a management, instrumentation, and discovery (MID) server 614 that facilitates communication of data between the network hosting the platform 604, other external applications, data sources, and services, and the client network 602. In an embodiment, the client network 602 may also include a connecting network device (e.g., a gateway or router) or a combination of devices that implement a customer firewall or intrusion protection system.

In at least one embodiment, one or more of the client devices 610 may be configured with a display that provides an interface, such as the interfaces 102 or 302 of FIGS. 1 and 3, respectively, for receiving input from a user or a virtual entity. In at least one embodiment, the client device 610 may further include instructions, e.g., algorithms, for operating as a CLI terminal by displaying a CLI at which the user may enter, as one example, a string of text formatted according to a specific syntax recognized by a database storing CIs of the computing system 600, such as the database 108 of FIG. 1. The database may be stored at one or more data centers 616 described further below.

In an embodiment, the client network 602 can be operably coupled to the network 406, which may include one or more suitable computing networks, such a large area network (LAN), wide area networks (WAN), the Internet, and/or other remote networks, that are operable to transfer data between the client devices 610 and the provider platform 604. In an embodiment, one or more computing networks within network 606 can comprise wired and/or wireless programmable devices that operate in the electrical and/or optical domain. For example, network 606 may include wireless networks, such as cellular networks (e.g., Global System for Mobile Communications (GSM) based cellular network), WIN networks, and/or other suitable radio-based networks. The network 606 may also employ any suitable network communication protocols, such as Transmission Control Protocol (TCP), Internet Protocol (IP), and the like. In an embodiment, network 606 may include a variety of network devices, such as servers, routers, network switches, and/or other suitable network hardware devices configured to transport data over the network 606.

In an embodiment, the provider platform 604 may be a remote network (e.g., a cloud network) that is able to communicate with the client devices 610 via the client network 602 and network 606. In an embodiment, the provider platform 604 can comprise a configuration management database (CMDB) platform. In at least one embodiment, the configuration CMDB platform may host a database management service, such as the database management service 101 of FIG. 1. In an embodiment, the provider platform 604 provides additional computing resources to the client devices 610 and/or the client network 602. For example, by utilizing the provider platform 604, in some examples, users of the client devices 610 are able to build and execute applications for various enterprise, IT, and/or other organization-related functions. In one embodiment, the provider platform 604 can be implemented on the one or more data centers 616, where each data center 616 can correspond to a different geographic location in some examples. In an embodiment, one or more the data centers 616 includes a plurality of servers 618 (also referred to in some examples as application nodes, virtual servers, application servers, virtual server instances, application instances, application server instances, or the like), where each server 618 can be implemented on a physical computing system, such as a single electronic computing device (e.g., a single physical hardware server) or across multiple-computing devices (e.g., multiple physical hardware servers). Examples of servers 618 can include a virtual server, a web server (e.g., a unitary Apache installation), an application server (e.g., a unitary Java Virtual Computer), and/or a database server. In at least one embodiment, at least one of the plurality of servers 618 may host the database storing CIs of the computing system 600.

To utilize computing resources within the provider platform 604, in an embodiment, network operators may choose to configure the data centers 616 using a variety of computing infrastructures. In an embodiment, one or more of the data centers 616 can be configured using a multi-instance cloud architecture to provide every customer with its own unique customer instance or instances. For example, a multi-instance cloud architecture of some embodiments can provide each customer instance with its own dedicated application server and dedicated database server. In some examples, the multi-instance cloud architecture could deploy a single physical or virtual server 618 and/or other combinations of physical and/or virtual servers 618, such as one or more dedicated web servers, one or more dedicated application servers, and one or more database servers, for each customer instance. In an embodiment of a multi-instance cloud architecture, multiple customer instances can be installed on one or more respective hardware servers, where each customer instance is allocated certain portions of the physical server resources, such as computing memory, storage, and processing power. By doing so, in some examples each customer instance has its own unique software stack that provides the benefit of data isolation, relatively less downtime for customers to access the platform 604, and customer-driven upgrade schedules.

In some embodiments, the provider platform 604 includes a computer-generated database management server that receives, via network 606 and/or an internal network within or across different data centers, computer-generated data for storage and analysis. For example, log entries can be sent from client devices/servers 610, MID server 614 (e.g., agent server acting as the intermediary in client network 602 to facilitate access to client network 602 by the network hosting the platform 604), and/or servers in data centers 616 to a log management server in data centers 616.

Although FIG. 6 illustrates a specific embodiment of a cloud computing system 600, the disclosure is not limited to the specific embodiments illustrated in FIG. 6. For instance, although FIG. 6 illustrates that the platform 604 is implemented using data centers, other embodiments of the platform 604 are not limited to data centers and can utilize other types of remote network infrastructures. Some embodiments may combine one or more different virtual servers into a single virtual server. The use and discussion of FIG. 6 are only examples to facilitate ease of description and explanation and are not intended to limit the disclosure to the specific examples illustrated therein. In an embodiment, the respective architectures and frameworks discussed with respect to FIG. 6 can incorporate suitable computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Embodiments of the disclosure can be described in view of the following clauses:

1. A method, comprising:
   obtaining data indicative of a request to modify a configuration item (CI) of a database;
   obtaining, based, at least in part, on the request, one or more portions of a pattern applicable to a service;
   identifying a command associated with the service, based on the one or more portions of the pattern; and
   modifying one or more values of the CI using the command.

2. The method of clause 1, further comprising using a neural network to generate the one or more portions of the pattern applicable to the service.

3. The method of any one of clauses 1-2, wherein obtaining the one or more portions of the pattern applicable to the service comprises receiving the one or more portions of the pattern as one or more predicted commands from a neural network.

4. The method of any one of clauses 1-3, wherein the command associated with the service comprises one or more allowed commands and/or implementable commands.

5. The method of any one of clauses 1-4, wherein identifying the command associated with the service comprises comparing the one or more portions of the pattern to a list of allowed commands implementable by the service.

6. The method of clause 5, wherein identifying the command associated with the service comprises identifying one or more matches in the list of allowed commands to the one or more portions of the pattern and generating one or more implementable commands from the one or more matches.

7. The method of clause 1, wherein modifying the one or more values of the CI comprises identifying the CI in the database using the command.

8. The method of clause 1, further comprising:
   in response to not locating the CI in the database using the command, creating a new CI using the data indicative of the request.

9. A system, comprising:
   one or more processors; and
   memory, including computer-executable instructions that, if executed by the one or more processor, cause the system to:
   obtain data indicative of a request to modify a configuration item (CI) of a database;
   obtain, based, at least in part, on the request, one or more portions of a pattern applicable to a service;
   identify a command associated with the service, based on the one or more portions of the pattern; and
   modify one or more values of the CI using the command.

10. The system of clause 9, wherein the CI is located in the database using the data indicative of the request.

11. The system of any one of clauses 9-10, wherein the data indicative of the request comprises one or more attributes of the CI.

12. The system of any one of clauses 9-11, wherein the one or more portions of the pattern are obtained from a neural network trained to parse the data indicative of the request and to generate the one or portions of the pattern as one or more predicted commands based on the data.

13. The system of any one of clauses 9-12, wherein the one or more portions of the pattern comprises one or more predicted commands generated according to a format recognized by the service.

14. The system of any one of clauses 9-13, wherein the one or more portions of the pattern are used to identify the command associated with the service by matching the one or more portions of the pattern to entries of a table of allowed commands to obtain a set of implementable commands.

15. A non-transitory computer-readable storage medium having stored thereon executable instructions which, when executed by one or more processor of a computer system, cause the computer system to:
   obtain a request to locate a configuration item (CI) of a database
   obtain, based, at least in part, on the request, one or more portions of a pattern applicable to a service;
   identify a command associated with the service, based on the one or more portions of the pattern; and
   locate the CI using the command.

16. The non-transitory computer-readable storage medium of clause 15, wherein the request further comprises one or more modifications to be applied to the CI, and wherein, in response to location of the CI in the database, the one or more modifications are to be applied to the CI to generate a modified CI.

17. The non-transitory computer-readable storage medium of any one of clauses 15-16, wherein the executable instructions further cause the computer system to provide a notification comprising:
   one or more new attributes of the modified CI; and
   one or more previous attributes of the modified CI.

18. The non-transitory computer-readable storage medium of clause 15, wherein, in response to not locating the CI in the database, the executable instructions further cause the computer system to:
   generate a new CI using the command;
   store the new CI in the database; and
   provide a notification of creation of the new CI.

19. The non-transitory computer-readable storage medium of clause 18, wherein the new CI is a shallow CI without dependencies on one or more other CIs in the database.

20. The non-transitory computer-readable storage medium of clause 15, wherein the request is obtained from a command line interface (CLI) of the service.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the resent disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A method, comprising:
    obtaining, via processing circuitry, data indicative of a request to perform an operation by a service for a configuration item (CI) of a database;
    in response to determining the request is valid, obtaining, via the processing circuitry and based at least in part on the request, one or more portions of a pattern applicable to the service;
    predicting, via the processing circuitry, one or more step names of the operation based on the one or more portions of the pattern;
    querying, via the processing circuitry, a reference table using the predicted one or more step names, wherein the reference table comprises allowed commands implementable by the service, and wherein the allowed commands comprise a format recognized by the service;
    determining, via the processing circuitry, a command associated with the service using the reference table and based on the predicted one or more step names; and
    performing the operation for the CI using the command.

2. The method of claim 1, further comprising using a neural network to generate the one or more portions of the pattern applicable to the service.

3. The method of claim 1, wherein a neural network is used for predicting the one or more step names of the operation based on the one or more portions of the pattern.

4. The method of claim 1, wherein the command associated with the service comprises one or more commands of the allowed commands.

5. The method of claim 1, wherein determining the command associated with the service comprises comparing the predicted one or more step names to the allowed commands implementable by the service.

6. The method of claim 5, wherein determining the command associated with the service comprises identifying one or more matches in the allowed commands and generating one or more implementable commands from the one or more matches.

7. The method of claim 1, wherein performing the operation for the CI comprises identifying the CI in the database using the command.

8. The method of claim 1, further comprising:
    in response to not locating the CI in the database using the command, creating a new CI using the data indicative of the request.

9. A system, comprising:
    one or more processors; and
    memory, including computer-executable instructions that, when executed by the one or more processors, cause the system to:
    obtain data indicative of a request to perform an operation by a service for a configuration item (CI) of a database;
    in response to determining the request is valid, obtain, based at least in part on the request, one or more portions of a pattern applicable to the service;
    predict one or more step names of the operation based on the one or more portions of the pattern;
    query a reference table using the predicted one or more step names, wherein the reference table comprises allowed commands implementable by the service, and wherein the allowed commands comprise a format recognized by the service;
    determine a command associated with the service using the reference table and based on the predicted one or more step names; and
    of perform the operation for the CI using the command.

10. The system of claim 9, wherein the CI is located in the database using the data indicative of the request.

11. The system of claim 9, wherein the data indicative of the request comprises one or more attributes of the CI.

12. The system of claim 9, wherein the one or more portions of the pattern are obtained from a neural network trained to parse the data indicative of the request.

13. The system of claim 9, wherein the one or more step names comprise one or more predicted commands generated according to the format recognized by the service.

14. A non-transitory computer-readable storage medium having stored thereon executable instructions which, when executed by one or more processor of a computer system, cause the computer system to:
    obtain a request to perform an operation by a service for a configuration item (CI) of a database;
    in response to determining the request is valid, obtain, based at least in part on the request, one or more portions of a pattern applicable to the service;
    predict one or more step names of the operation based on the one or more portions of the pattern;
    query a reference table using the predicted one or more step names, wherein the reference table comprises allowed commands implementable by the service, and wherein the allowed commands comprise a format recognized by the service;
    determine a command associated with the service using the reference table and based on the predicted one or more step names; and
    perform the operation for the CI using the command.

15. The non-transitory computer-readable storage medium of claim 14, wherein the request comprises one or more modifications to be applied to the CI, and wherein, in response to locating the CI in the database, the one or more modifications are to be applied to the CI to generate a modified CI.

16. The non-transitory computer-readable storage medium of claim 15, wherein the executable instructions further cause the computer system to provide a notification comprising:
one or more new attributes of the modified CI; and
one or more previous attributes of the modified CI.

17. The non-transitory computer-readable storage medium of claim 15, wherein, in response to not locating the CI in the database, the executable instructions further cause the computer system to:
generate a new CI using the command;
store the new CI in the database; and
provide a notification of creation of the new CI.

18. The non-transitory computer-readable storage medium of claim 17, wherein the new CI is a shallow CI without dependencies on one or more other CIs in the database.

19. The non-transitory computer-readable storage medium of claim 14, wherein the request is obtained from a command line interface (CLI) of the service.

20. The method of claim 1, wherein predicting the one or more step names of the operation comprises:
comparing the data indictive of the request with a plurality of key terms used in the allowed commands of the service; and
identifying the one or more portions of the pattern that match one or more key terms of the plurality of key terms.

* * * * *

UNITED STATES PATENT AND TRADEMARK OFFICE
CERTIFICATE OF CORRECTION

PATENT NO. : 12,423,274 B1
APPLICATION NO. : 18/596517
DATED : September 23, 2025
INVENTOR(S) : Abhishek Kumar, Ramesh Kumar and Praveen Singh Thakur Page 1 of 1

It is certified that error appears in the above-identified patent and that said Letters Patent is hereby corrected as shown below:

In the Claims

Column 22, Claim 9, Line 29, please delete the word "of" at the beginning of the line.

Signed and Sealed this
Eleventh Day of November, 2025

John A. Squires
*Director of the United States Patent and Trademark Office*